United States Patent [19]
Shapiro

[11] 3,741,656

[45] June 26, 1973

[54] FILL LEVEL MEASURING DEVICE

[75] Inventor: William A. Shapiro, Hackensack, N.J.

[73] Assignee: The Bendix Corporation, Teterboro, N.J.

[22] Filed: May 27, 1971

[21] Appl. No.: 147,554

[52] U.S. Cl. ............... 356/103, 73/293, 250/218, 356/209
[51] Int. Cl. ........................................ G01f 23/00
[58] Field of Search ............... 73/293; 250/222 R, 250/223 R, 218; 356/201, 209, 103

[56] References Cited
UNITED STATES PATENTS

| | | | |
|---|---|---|---|
| 1,706,857 | 3/1929 | Mathe | 73/293 X |
| 3,272,174 | 9/1966 | Pribonic | 73/293 X |
| 3,404,282 | 10/1968 | Walker | 250/223 R X |

*Primary Examiner*—Ronald L. Wibert
*Assistant Examiner*—F. L. Evans
*Attorney*—Anthony F. Cuoco and Plante, Hartz, Smith & Thompson

[57] ABSTRACT

Apparatus employing optical means for measuring the level of a liquid or granular substance in a container under conditions when actual contact or even close proximity of the apparatus and the substance is impractical or undesirable.

8 Claims, 4 Drawing Figures

PATENTED JUN 26 1973 3,741,656

INVENTOR.
WILLIAM A. SHAPIRO
BY
*Anthony T. Lucro*
ATTORNEY

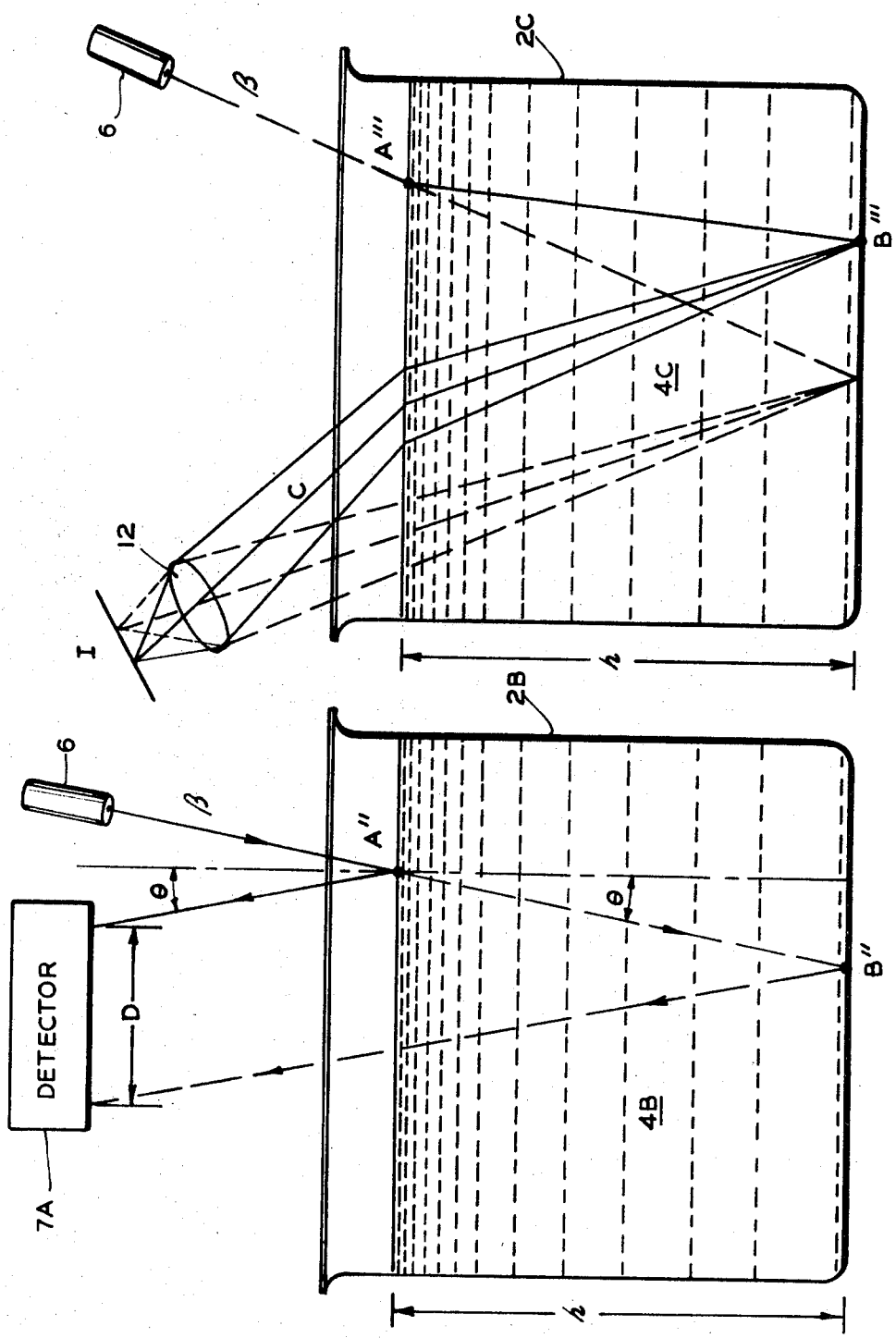

FILL LEVEL MEASURING DEVICE

BACKGROUND OF THE INVENTION

1. Field of the Invention

This invention relates to level measuring devices and, more particularly, to optical means for measuring the height of a liquid substance such as an acid, or a granular substance such as crushed rock, in a container, when contact between the device and the substance is undesirable. The invention is operable with moving substances such as those under agitation or in motion due to filling the container.

2. Description of the Prior Art

Prior to the present invention it has been difficult to measure the level of highly corrosive substances such as strong acids in large storage containers because positioning the measuring device in contact with or in close proximity to the substance is often impractical. Difficulty is also experienced in measuring the height of crushed rock in very large containers since sonic methods are not presently usable beyond certain container depths.

SUMMARY OF THE INVENTION

This invention contemplates a level measuring device having no moving parts and including a collimated source of light having a narrow beam width relative to the diameter of the container holding the substance together with associated optical and detecting equipment. The invention can use either specularly reflected light, scattered light or light which may be transmitted through the substance in the container to determine the level of said substance in the container.

The main object of this invention is to provide means for measuring the level of a substance in the container when contact between the measuring means and the substance or even close proximity thereof is impracticable or undesirable Another object of this invention is to provide a device of the type described which measures the level of a liquid or granular substance in motion due to agitation or to filling a container with the substance.

Another object of this invention is to measure the level of a scattering liquid or solid, of a light absorbing liquid or a clear liquid.

Another object of this invention is to provide a device of the type described including optical means having no moving parts.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

DESCRIPTION OF THE DRAWINGS

FIG. 3 is a diagrammatic representation of the device of the invention adapted for measuring the level of a light absorbing liquid.

FIG. 4 is a diagrammatic representation of the invention adapted for measuring the level of a clear liquid.

DESCRIPTION OF THE INVENTION

Figure 1:
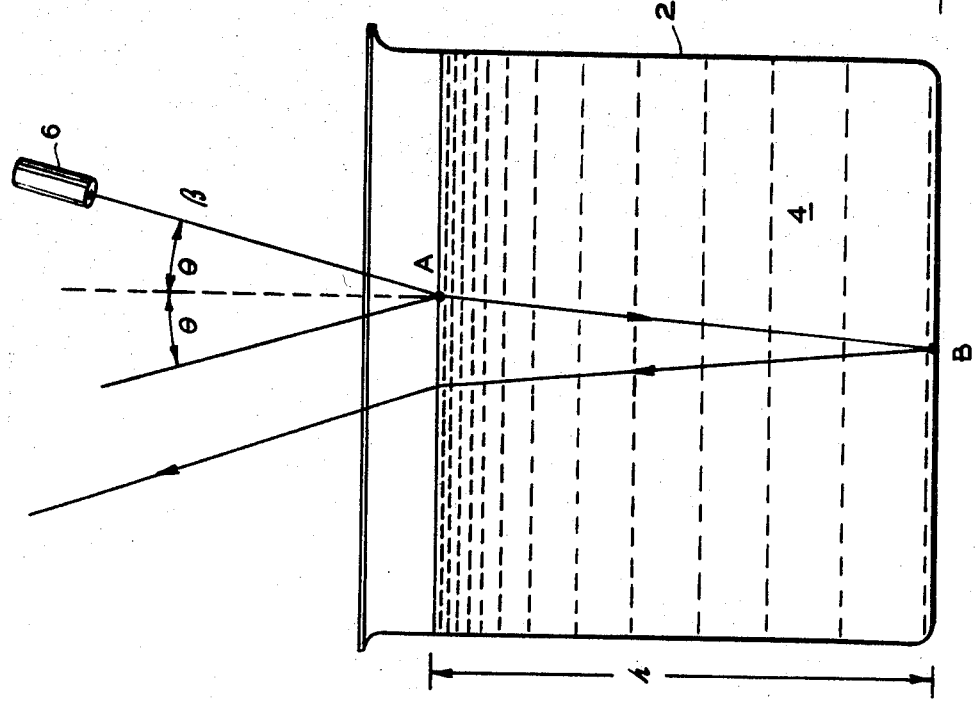
FIG. 1 is a diagrammatic representation illustrating the basic principle of the invention.

Referring first to FIG. 1, there is shown a container 2 filled with a liquid or granular substance 4 to a height $h$. A light source 6 which may be a laser device, emits a narrow intense light beam $\beta$, and which beam strikes liquid 4 at a point A. In general, part of the beam is specularly reflected from the liquid surface, forming a return beam S whose angle with the normal to the liquid surface is equal to that of the incident beam $\beta$, and which angle is designated as $\theta$.

Another part of beam $\beta$, striking liquid 4 at point A, is scattered and still another part of the beam is transmitted (refracted) through the surface of the liquid, striking the bottom of the container at a point B. The angle of the transmitted beam depends on the index of refraction of the liquid, and the position of point B at which the transmitted beam strikes the bottom of the container depends on height ($h$) of the liquid.

It is assumed that the bottom of container 2 is not extremely smooth. The transmitted beam is substantially scattered at point B, and if liquid 4 is reasonably clear the scattered light proceeds back out of the liquid, being refracted again so as to produce a virtual image of point B.

It will now be understood that the relative intensities of the various beams provided as aforenoted depend on the specific characteristics of the substance in container 2. For example, in the case of a granular substance virtually all of the returning light will be due to scattering at point A. In the case of a clear, still liquid, the virtual image of point B provides most of the return light. If the liquid is being agitated, both a specular and scattered return from point A result, as is also the case if the substance is a colloidal solution or is otherwise of high reflectivity and low transmissiveness.

It is to be noted that the particular light source chosen depends on the nature of the substance and on the dimensions of container 2. If, for example crushed rock is involved, with average particle size in the order of six inches, stored in a container having a diameter in the order of 100 feet, a light beam diameter of several feet is appropriate. A laser is not necessary to provide a light beam such as described immediately above, and other light sources may be used. However, if the container is only a few feet in diameter and is filled with a liquid, a laser beam of the usual several millimeters diameter is indicated.

As heretofore noted, positions of points A, B and the virtual image of point B depend on height ($h$) of the substance in the container, providing only that the incidence angle ($\theta$) is not zero and that the refractive index of the substance in the container is not unity. In this connection it is to be noted that even if angle ($\theta$) is zero, the position of point A can still be used to infer the level of the substance.

Figure 2:
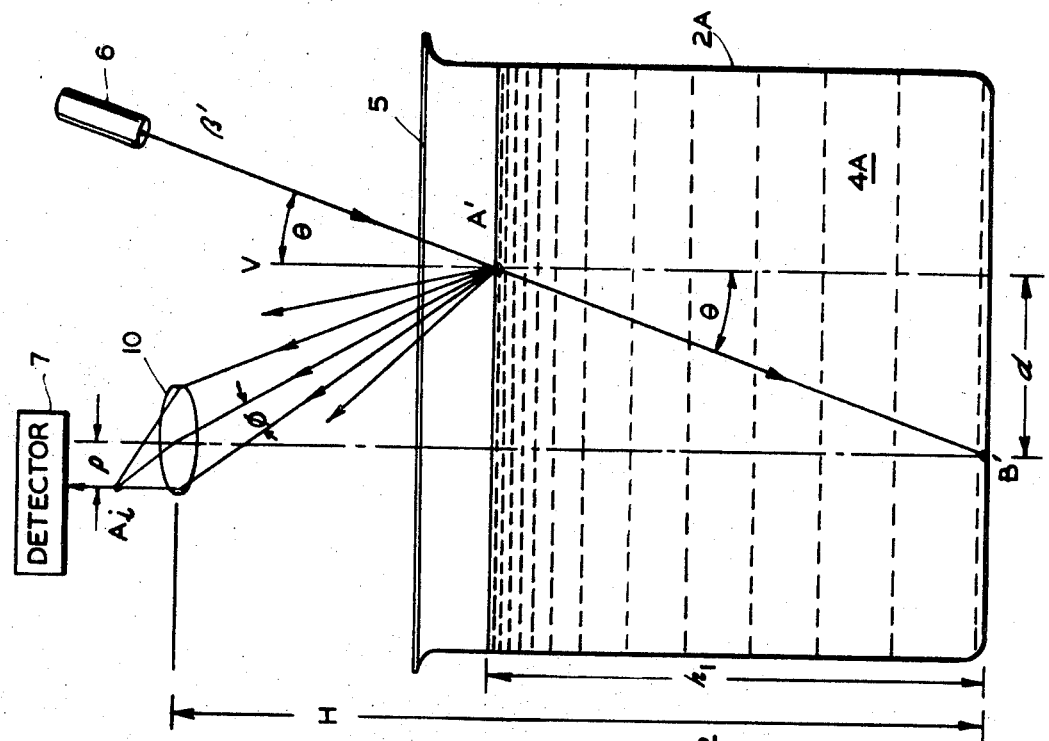
FIG. 2 is a diagrammatic representation of the device of the invention adapted for measuring the level of a scattering liquid or solid.

The embodiment of the invention shown in FIG. 2 is for measuring the level of scattering liquids or solids, with a liquid 4A in a container 2A being shown by way of example. The lateral position of point A' at which beam B strikes liquid 4A is a function of height ($h$) of the liquid. In particular, if the angle which the light beam makes with the vertical is $\theta$, and if the undeviated beam strikes the substance at point B' when the surface level is at the bottom of the tank, then the lateral deviation (d) of points A' and B', when the substance is at height (h), is given by the relation.

$$d = h \tan \theta \quad (1)$$

In order to sense the lateral position of point A', an objective lens 10 is positioned above the top of container 2 (FIG. 1) or 2A (FIG. 2) at a distance H from the bottom thereof and outside a transparent container cover 5 if desired. In back of the lens is a detection means 7 situated in the focal plane of the lens. The focal length of lens 10 should be quite short compared to the minimum distance between the lens and liquid surface if the sharpness of the image is not to be degraded by defocusing as the liquid level changes. The aperture size of the lens should also be chosen so as to provide a relatively high f/number, thereby also tending to reduce defocusing. Detection means means 7 is such as to indicate the lateral position of an image $A_i$ of the point A' in the detection plane. This position corresponds to the angular position d of point A' with respect to the axis of lens 10, noting that the angular position is a function of liquid surface level.

In the embodiment of the invention shown in FIG. 2, the optical axis of lens 10 intercepts the bottom of the container at the same point, B', at which the undeviated source beam B strikes the container bottom. This simplifies analysis of the invention but is neither necessary nor always desirable, and is not meant to limit the invention.

Thus, if lens 10 is a distance H from the container bottom, and if the effective focal length of the lens is f and the optical axis is as shown, then image $A_i$ appears at a distance p from the optical axis in the focal plane of lens 10 as follows:

$$p = f \sin \theta; \quad \tan \phi = (h/H-h) \tan \theta \quad (2)$$

Lens 10 can have unequal focal lengths in its tangential and saggittal planes (with respect to the beam interception points A', B', etc.) so as to produce a line image rather than a point image from the scattered light beam energy. Such an image might be used with detector 7 which includes an appropriate set of masked detectors for providing a digitally coded indication of height (h). In this connection, detector 7 may be of the type described in copending U.S. application Ser. No. 29,819, filed by William A. Shapiro on Apr. 20, 1970, and assigned to The Bendix Corporation, assignee of the present invention.

With reference now to FIG. 3, the device of the invention is used to measure the level of an absorbing liquid 4B in a container 2B when the container has a smooth bottom surface. In this case, the specular reflection from a point A'', at which light beam β strikes the liquid surface, is dominant since the scattering is small and little or no light is transmitted through the substance.

The reflected beam is always at the same angle, namely the angle θ, at which original beam β was incident. However, the lateral position of the returned beam (D) on the detector, changes with liquid height (h) in accordance with the following relation:

$$D = 2h \tan \theta \quad (3)$$

No objective optics are necessary in this case if a detection device 7A is used to indicate the lateral position of the return beam. If direct digital signals are desired detection device 7A may be of the type described in the aforenoted copending U.S. application Ser. No. 29,819. In this instance, a cylindrical objective lens whose zero-power plane is coincident with the return beam may be used, or source beam β may be cylindrically diverged. In either case the result is a line image at the liquid surface.

It is to be noted that angle θ must be kept small if the lateral travel of the return beam, as depth h changes is to be kept to a reasonable amount. This is necessary because the return beam is specularly reflected rather than scattered, so that detection means 7A must be large enough to intercept the entire range of lateral beam motion. In the embodiment of the invention described with reference to FIG. 2, wherein incident beam β is scattered, the return beam is spread over a large angular interval and will thus intercept a detection means even when such means is not within the region of specular reflection. In the embodiment of the invention shown in FIG. 3 it is to be further noted that there is no dependence of lateral position D on the distance from the liquid surface to the detection means.

Note that if the liquid 4b is clear and the container bottom is optically smooth, the same arrangement may be used.

FIG. 4 shows an embodiment of the invention wherein the depth of the clear standing liquid 4C in a container 2C having a smooth bottom surface is measured. The scattering from incident point A''' is small or nil, or it is deemed desireable not to use the scattered or specular light because of the fact that very little of the light energy (typically 4 percent specular reflection, even less scattered) is available through these processes.

Beam β is partly refracted at point A''', scattered at B''' and refracted again as it leaves the liquid. The angle which the central scattered beam (C) makes with the optical axis of a lens 12 determines the position of an image I of point B''' in the focal plane of the lens. The angle of beam C with the optical axis is in turn determined by height h of the liquid and by the position and orientation of lens 12, since that position and orientation in turn determines which of the scattered rays will be intercepted at the center of the lens aperature.

The relationship between the position of A''' and depth h is complicated and need not be given for purposes of describing the present invention. The relation in fact changes form when height h reaches a value such that central beam C intercepts the liquid surface at the same point at which the optical axis intercepts that surface.

It will suffice to say that the relationship can be witten in closed form, or alternatively, the relationship can be determined empirically. Such determination may in fact be necessary in those cases where the bottom of the container is not flat.

It may be practical, in some cases, to increase the amount of light scattered from the liquid surface by using a sound source in contact with the outside of the container, thus causing uniform steady-state agitation of the surface, of a wavelength smaller than the incident beam diameter, or of such frequency that the waves move rapidly across the surface.

It is seen from the aforegoing description of the invention that a device is provided which measures the level of a liquid or granular substance in a container, with no physical contact or even close proximity with the substance. The device may be used to measure the height of a scattering liquid or solid, or of a reflecting absorbing liquid, or a clear liquid in a container with a smooth or a scattering bottom surface.

Although several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Apparatus for measuring the level of a substance in a container, comprising:

means disposed above the container for emitting a light beam which strikes the substance;

part of said light beam being specularly reflected from the surface of the substance, another part being scattered from an incident point on the surface of the substance and yet another part being transmitted through the substance and being scattered from an incident point on the bottom of the container;

said last memtioned light being effective for providing a virtual image of the incident point on the bottom of the container; and means for determining the relative positions of the incident point on the surface of the substance, the incident point on the bottom of the container and the virtual image of said last mentioned point, said positions being a measure of the level of the substance in the container.

2. Apparatus as described by claim 1, wherein:

the light beam emitting means is laterally disposed relative to the surface of the substance so that the lateral deviation of said incident points varies as the product of the level of the substance and the tangent of the angle that the light beam makes with the normal to the surface of the substance.

3. Apparatus as described by claim 2, including:

an objective lens positioned above the container for intercepting and transmitting the light scattered from the incident point on the surface of the substance and the light scattered from the point on the bottom of the container; and means positioned above the lens and responsive to the light transmitted thereby for indicating the lateral position of the first mentioned incident point.

4. Apparatus as described by claim 3, wherein:

the objective lens is laterally disposed relative to the surface of the substance to provide an image of the first mentioned point at a predetermined distance from the optical axis of the objective lens.

5. Apparatus as described by claim 4, wherein:

the objective lens is laterally disposed relative to the surface of the substance so that the predetermined distance varies as the product of the focal length of the objective lens and the sine of the angle the light beam makes with the normal to the surface of the substance.

6. Apparatus as described by claim 1, wherein:

the light beam emitting means is laterally disposed relative to the surface of the substance so that the lateral deviation of said incident points varies as twice the product of the level of the substance and the angle the light beam makes with the normal to the surface of the substance.

7. Apparatus as described by claim 3, wherein:

the means positioned above the lens and responsive to the light transmitted thereby for indicating the lateral position of said first mentioned incident point includes light detection means; and the light from the incident point on the bottom of the container is spread over a large angular interval so as to be within the range of the detection means even when said means is outside the region of specular reflection.

8. Apparatus as described by claim 1, wherein:

the light beam emitting means is laterally disposed relative to the surface of the substance so that the lateral deviation of the incident points is independent of the distance of the relative position determining means from the surface of the substance.

* * * * *